United States Patent [19]

Burke

[11] Patent Number: 4,629,390

[45] Date of Patent: Dec. 16, 1986

[54] TRUCK BED UNLOADER

[76] Inventor: Donald D. Burke, 9719 N. Flora, Kansas City, Mo. 64155

[21] Appl. No.: 666,999

[22] Filed: Oct. 31, 1984

[51] Int. Cl.[4] ............................................. B60P 1/38
[52] U.S. Cl. .................................. 414/527; 15/256.5; 242/86.52; 242/86.5 R; 242/106; 298/1 B; 296/51; 296/39 R; 296/57 R; 414/539
[58] Field of Search ..................... 296/51, 39 R, 57 R; 15/256.5; 414/523, 528, 908, 911, 539, 527; 298/1 R, 1 B; 242/86.52, 106, 86.5 R

[56] References Cited

U.S. PATENT DOCUMENTS

| | | |
|---|---|---|
| 1,470,373 | 10/1923 | Barrier ............................ 242/106 X |
| 2,111,527 | 3/1938 | Blanc ............................ 242/86.5 X |
| 2,448,122 | 8/1948 | Recker ............................ 414/527 |
| 2,477,707 | 8/1949 | Walz . |
| 2,808,159 | 10/1957 | Simo . |
| 2,876,917 | 3/1959 | King ............................ 414/539 |
| 3,173,564 | 3/1965 | Mayo ............................ 414/528 X |
| 3,443,703 | 5/1969 | Matsumoto ............................ 414/539 |
| 3,877,714 | 4/1975 | Black ............................ 296/51 X |
| 3,881,768 | 5/1975 | Nix ............................ 296/39 R |
| 3,978,996 | 7/1976 | Oltrogge ............................ 414/527 X |
| 4,091,946 | 5/1978 | Kraeft et al. ............................ 242/86.5 X |
| 4,489,823 | 12/1984 | Gordon ............................ 15/256.5 X |
| 4,505,633 | 3/1985 | Butler ............................ 414/528 |

FOREIGN PATENT DOCUMENTS 2729645  1/1979  Fed. Rep. of Germany ..... 15/256.5

Primary Examiner—Frank E. Werner
Attorney, Agent, or Firm—Kokjer, Kircher, Bradley, Wharton, Bowman & Johnson

[57] ABSTRACT

A device which unloads materials from a vehicle cargo area such as the bed of a pickup truck. A pair of mounting brackets are bolted to opposite sides of the vehicle bed. Pivoted to the brackets are the front ends of rigid frame arms which carry a rotatable drum between their back ends. A flexible conveyor sheet is wound on the drum and can be unwound onto the vehicle bed to receive materials loaded therein. A motor driven or manually operated drive system rotates the drum to unload the cargo as the conveyor sheet is wound up on the drum. The pivotal mounting of the frame arms permits them to be raised with the tailgate of the vehicle to a storage position during transport of the load.

14 Claims, 13 Drawing Figures

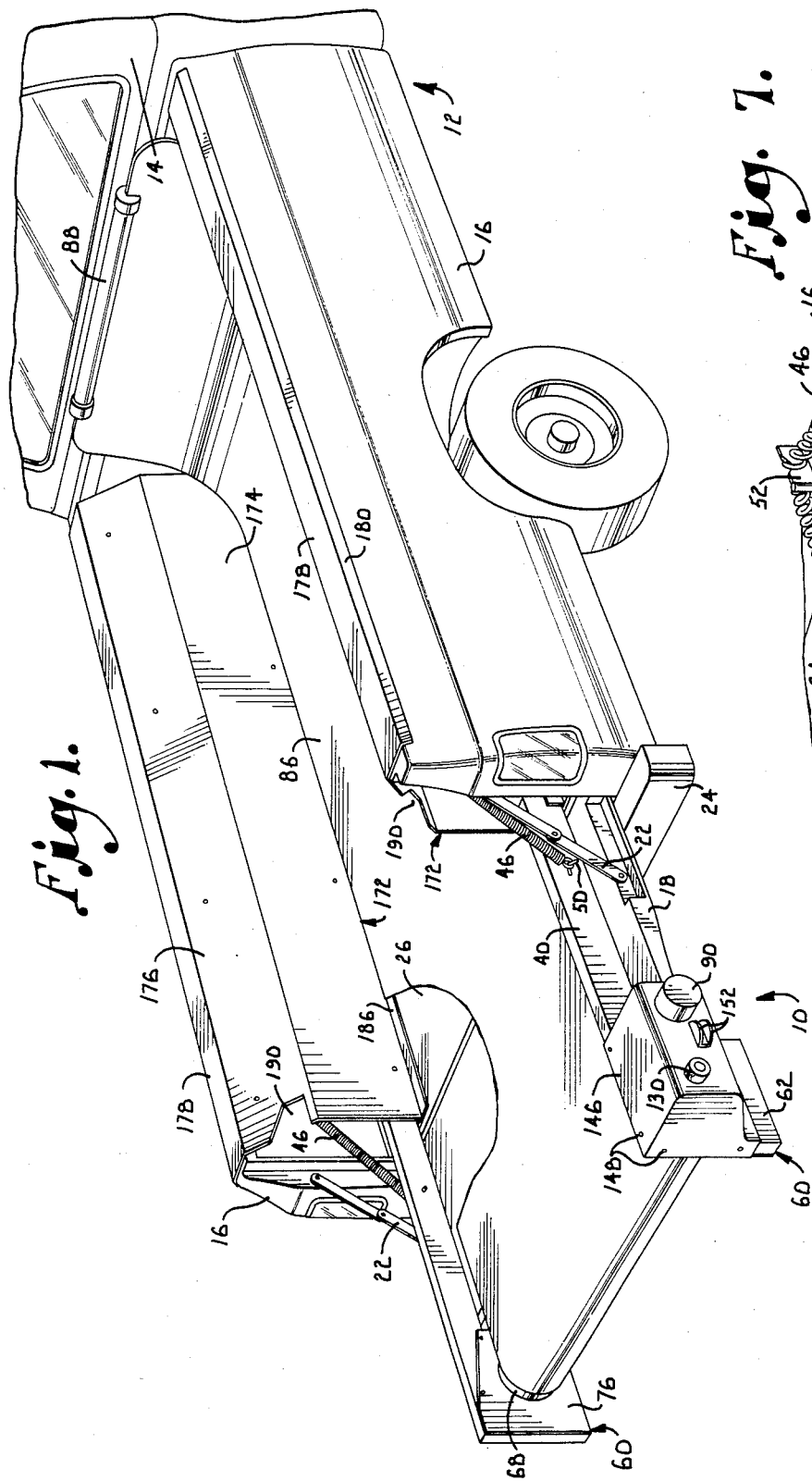
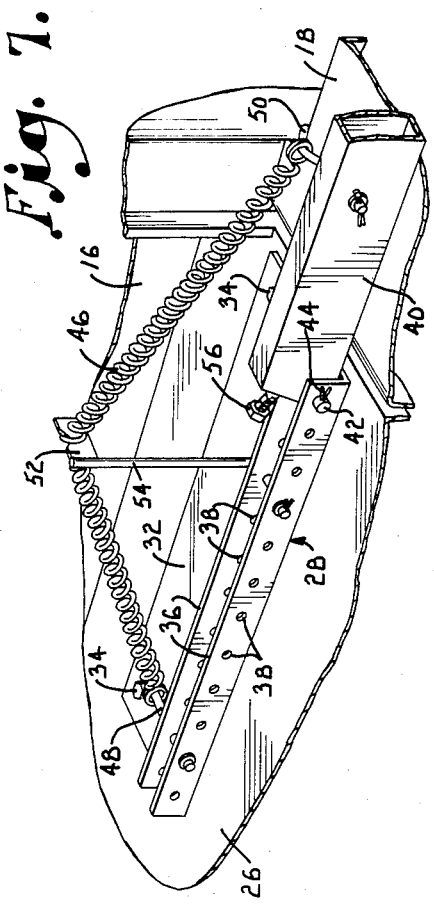

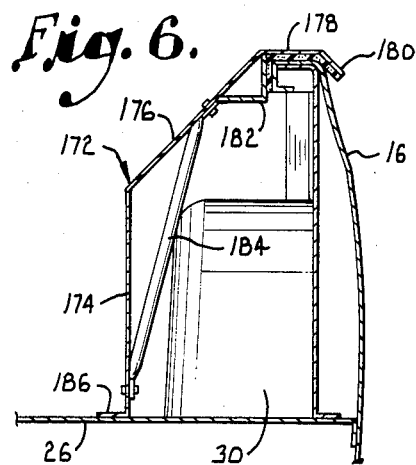
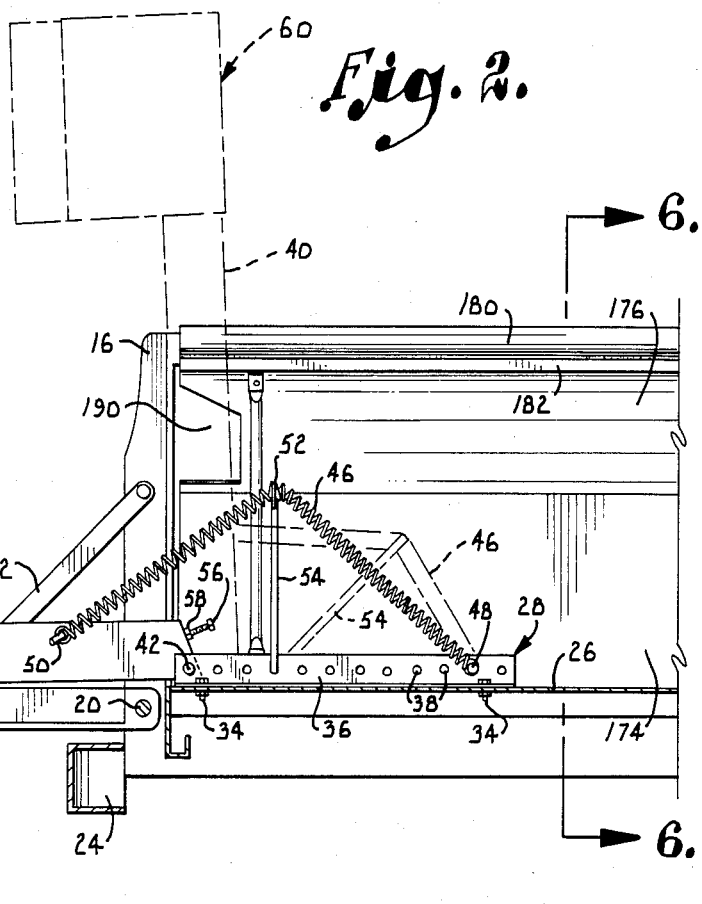
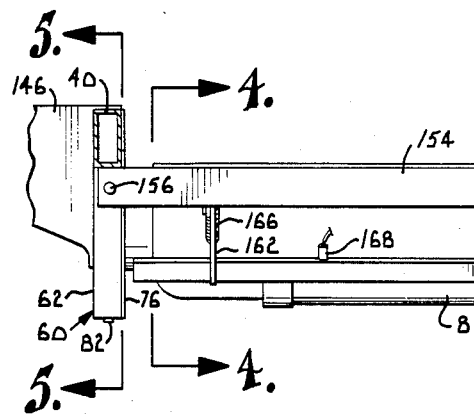
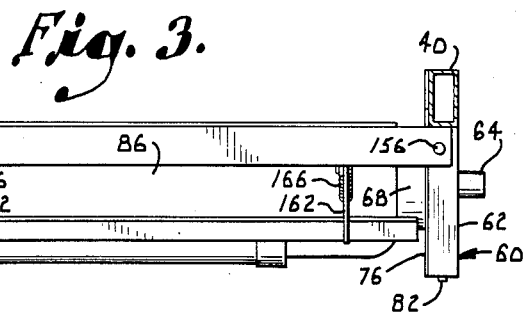
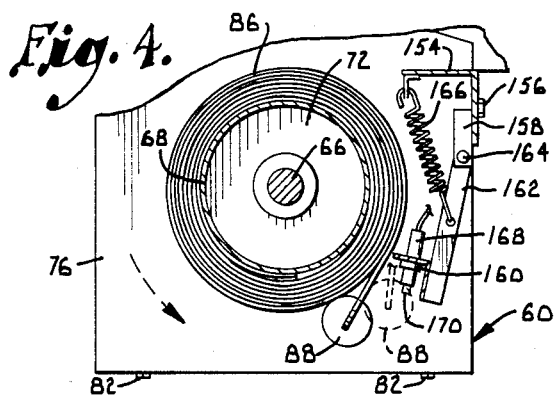
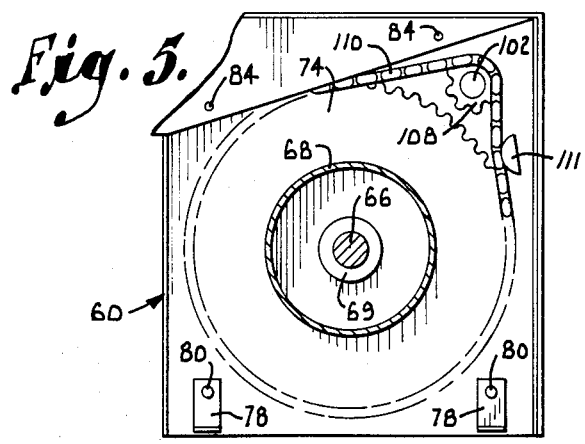

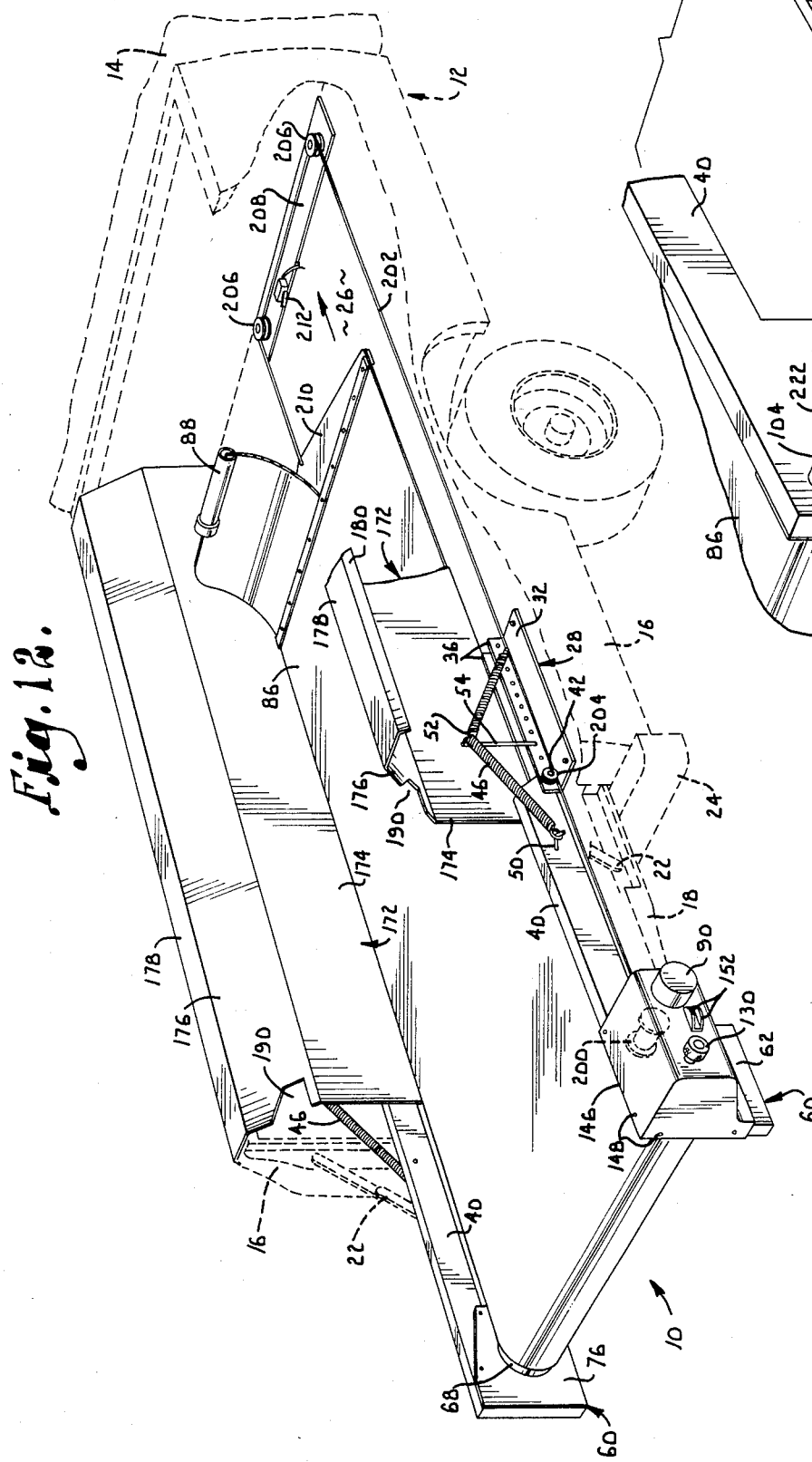
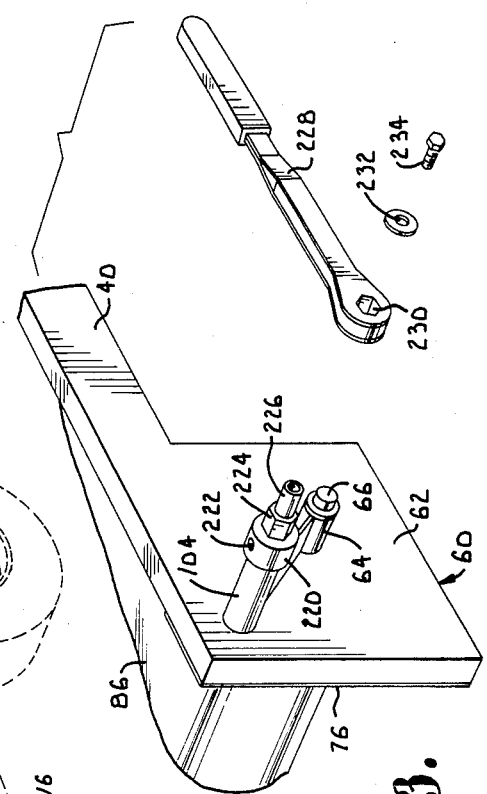

TRUCK BED UNLOADER

BACKGROUND OF THE INVENTION

This invention relates generally to the handling of materials in vehicle beds and more particularly to apparatus which operates to unload a wide variety of materials from the cargo areas of vehicles such as pickup trucks and trailers.

Among the types of materials that are commonly carried in the cargo area of a pickup truck are granular materials such as sand, gravel, dirt and grain; building materials such as lumber, drywall panels, siding panels, bricks, stone and roofing materials; containers such as boxes, drums and cartons; waste materials such as brush, tree trimmings, scrap, tires and demolition debris; machinery such as air compressors and other relatively heavy pieces of equipment; and miscellaneous objects such as firewood, animal feed, hay bales, tools and other items. In many cases, unloading of the truck bed is a difficult and time consuming activity. For example, unloading of sand, gravel or dirt with a shovel can take a considerable amount of time and require substantial physical labor. Heavier objects are also difficult to unload, particularly those that are carried in the front end of the cargo area near the cab and must be moved to the tailgate area before they can be unloaded.

These problems have been recognized, and attempts have been made to develop equipment to facilitate the unloading of vehicle beds, as exemplified by U.S. Pat. No. 3,978,996 to Oltrogge. However, the unloading devices that have been proposed in the past have been less than satisfactory in a number of respects. Devices which are permanently mounted in the truck bed are impractical because they occupy significant parts of the cargo area and thus reduce its cargo carrying capacity and obstruct access to the truck bed. Devices of the type shown in the Oltrogge patent apply heavy loads to the relatively weak tailgate which can bend the tailgate, break its hinge or cause other damage. It is not desirable to attach the add on equpment directly to the tailgate because it is sometimes necessary or desirable to remove the tailgate.

The unloading device shown in the aforementioned Oltrogge patent is also characterized by structural weakness and the inability to handle heavy loads. Another problem is that mud and other debris can build up on the conveying belt and cause it to wind up unevenly on its roller. The build up of foreign matter on the belt can also create an uneven roll diameter which can result in the uneven application of tension, thereby unduly stressing some areas of the belt and possibly tearing or otherwise damaging or excessively wearing the belt. Hand cranking is an additional drawback because at some positions of the crank, leverage is lacking and the body weight cannot be used to good advantage.

SUMMARY OF THE INVENTION

The present invention is directed to a truck bed unloader which permits virtually any load to be quickly and easily unloaded from the cargo area of a truck or trailer. It is the primary goal of the invention to provide an unloader which is structurally sound and which is not subject to the various shortcomings associated with the equipment that has been proposed in the past.

More specifically, it is an important object of the invention to provide a truck bed unloader which can be quickly and easily installed in and removed from a truck bed or trailer. In accordance with the invention a pair of sturdy mounting brackets are bolted or otherwise secured to the truck bed at locations behind the wheel wells where they do not detract significantly from the cargo carrying capacity of the vehicle or obstruct access to the vehicle bed. A plastic conveyor sheet which can be unrolled onto the bed is wound on a drum mounted between a pair of beam-like arms pinned to the mounting brackets. The frame and drum can be installed simply by inserting the pins, and removal requires only that the pins be removed.

Another important object of the invention is to provide a truck bed unloader having a frame constructed to withstand the heaviest loads that are encountered. The beamlike arms act to give the unit columnar strength in line with the forces that are applied during operation of the unloader. The drum is mounted on a sturdy axle which extends between the arms and is able to accommodate misalignment and irregularities in the truck bed or frame and also to withstand any twisting or torsional forces applied when heavy loads are handled.

A further important object of the invention is to provide an unloader which is pivotally conected with the vehicle bed so that it can be stored in an upright position against the tailgate when cargo is being carried in the truck or when the truck bed is empty. In the storage position of the unloader, the truck can function in the normal manner with the tailgate closed. Adjustable stops on the frame arms assure that the arms are held firmly against the tailgate so that significant back and forth whipping action does not occur. Another feature of the invention is the spring suspension system which provides assistance in raising the unit to the stored position.

It is another important feature of the pivotal mounting arrangement that the top of the drum is aligned with the vehicle bed in the operating position. Consequently, there is no need to elevate loads during the unloading operation, and the low position at which the center of the sheet tension is maintained helps to hold the unit down.

Yet another object of the invention is to provide an unloader which can be mounted either outboard of the tailgate or inboard if the tailgate is removed. This is possible because of the adjustability of the connection between the frame arms and the mounting brackets, which also accommodates various bumper depths so that the unit can be installed on a wide variety of vehicles.

A still further object of the invention is to provide an unloader which is not attached to the tailgate and which does not unduly load the tailgate.

An additional important object of the invention is to provide an unloader having a wiper blade which wipes dirt and other debris off of the conveyor sheet as it is moved out of the truck bed and wound onto the drum. The wiper blade is strategically located so that materials which are wiped from the sheet fall onto the ground, and it is spring loaded so that variations in the drum diameter are accommodated while uniform contact is maintained across the sheet. The spring loaded wiper blade additionally serves to resist inadvertent unwinding of the sheet and to provide a convenient mounting for a limit switch which automatically shuts off the drive motor when the sheet is fully wound on the drum.

Still another object of the invention is to provide an unloader which can be operated either manually or by an electric motor. The manually operated embodiment employs a ratchet lever which allows full advantage to be taken of leverage and the body weight of the operator. The power operated embodiment includes a unique clutch which is easily operated to disengage the drive train so that the conveyor sheet can be unwound into the vehicle bed, either manually or by a winch and cable arrangement driven by the motor. The power operated winch and cable arrangements allows heavy loads to be loaded into the bed. In both the manual and motor driven embodiments, the drive components and bearings are sealed within enclosed housings which prevent the parts of the drive system from being contaminated by dirt and other foreign matter.

A further object of the invention is to provide, in an unloader of the character described, side panels which can be quickly and easily applied to and removed from the side walls of the truck bed and which protect the bed and prevent dirt and other materials from leaking beneath the conveyor sheet.

Yet another object of the invention is to provide an unloader which is constructed in a durable manner and which is reliable in operation with little maintenance requirements.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a perspective view showing a truck bed equipped with an unloader constructed according to a preferred embodiment of the present invention, with the conveyor sheet fully unwound onto the truck bed and a portion of the sheet broken away for purposes of illustration;

FIG. 2 is a fragmentary sectional view showing the unloader installed in the truck bed, with the broken lines illustrating the storage position of the unloader;

FIG. 3 is a fragmentary sectional view taken generally along line 3—3 of FIG. 2 in the direction of the arrows;

FIG. 4 is a fragmentary sectional view on an enlarged scale taken generally along line 4—4 of FIG. 3 in the direction of the arrows;

FIG. 5 is a fragmentary sectional view taken generally along line 5—5 of FIG. 3 in the direction of the arrows;

FIG. 6 is a fragmentary sectional view taken generally along line 6—6 of FIG. 2 in the direction of the arrows;

FIG. 7 is a fragmentary sectional view showing one side of the spring suspension system of the unloader;

FIG. 12 is a perspective view showing the bed area of a pickup truck equipped with an unloader constructed according to a modified form of the invention which also serves as a power operated loading device, with the truck shown in broken lines and portions broken away for purposes of illustration; and FIG. 13 is a perspective view showing a manually operated drive system which may be used as an alternative to drive the unloader.

DETAILED DESCRIPTION OF THE INVENTION

Figure 8:
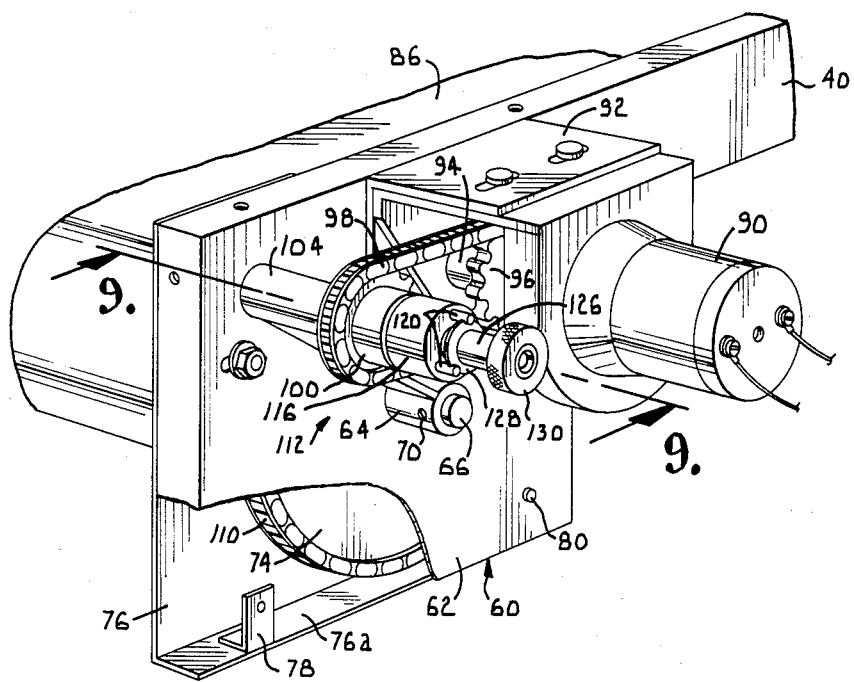
FIG. 8 is a fragmentary perspective view showing part of the drive system of the unloader, with the motor housing removed and a portion of the sprocket housing broken away for purposes of illustration.

Referring now to the drawings in detail and initially to FIG. 1, the present invention provides an unloader which is generally designated by numeral 10 and which operates to unload materials from a vehicle cargo area such as the bed of a conventional pickup truck 12. The vehicle bed is located behind the truck cab 14 and between a pair of sidewalls 16. The back end of the bed can be opened and closed by a tailgate 18 having a hinge connection 20 (see FIG. 2) with the vehicle bed. The tailgate 18 is connected with the sidewalls 16 by conventional tailgate brackets 22. The tailgate 18 can be opened and closed in the usual manner about the hinge connection 20 to open and close the back end of the vehicle bed. A bumper 24 underlies the tailgate. The bottom of the vehicle bed is formed by a floor 26 which forms a horizontal surface on which cargo is carried in the vehicle bed.

In accordance with the present invention and as shown best in FIGS. 2 and 7, a pair of metal mounting brackets 28 are bolted or otherwise secured to the floor 26. The brackets 28 are mounted on opposite sides of the vehicle bed adjacent to the opposite sidewalls 16 and behind wheel wells 30 (see FIG. 6) which project upwardly into the bed adjacent to the walls. Each bracket 28 includes a flat mounting plate 32 which is secured to the floor 26 by a pair of bolts 34 or in any other suitable manner. A pair of flanges 36 extend upwardly from each mounting plate 32. The flanges 36 are spaced apart and parallel to one another and are provided with a plurality of aligned holes 38. The holes 38 are spaced apart along the length of each flange 36.

The frame of the unloader includes a pair of parallel frame arms 40 each in the form of a hollow rectangular beam. The front ends of the arms are pivoted to the respective mounting brackets 28. Each arm fits closely between the flanges 36 and is pivoted thereto by a pivot pin 42. The pins 42 are extended through selected holes 38 and through the front end of the arm 40. A retaining pin 44 secures each pin 42 in place. The pivot pins 42 are axially aligned with one another and cooperate to establish a horizontal pivot axis about which the frame of the unloader can pivot between the working position shown in solid lines in FIG. 2 and the storage position shown in broken lines in FIG. 2.

Each side of the unit is equipped with a spring suspension system which provides assistance in raising the frame to the storage position. A tension spring 46 is hooked at its front end to a pin 48 which is secured in selected holes 38 of the mounting bracket 28. The back end of each spring 46 is secured to a hook 50 which projects from the arm 40. The center of each spring 46 is engaged on a small plate 52 carried on the top end of a vertical rod 54. The lower end of the rod 54 is bent at a right angle and is extended through selected openings 38 to establish a horizontal pivot axes about which the rod can pivot.

An adjustment screw 56 is threaded into the front end of each arm 40 to provide an adjustable stop for limiting the forward travel of the frame arms. A lock nut 58 (see FIG. 2) is threaded onto each adjustment screw 56 and may be tightened against the end of arm 40 to secure the adjustment screw in place. The adjustment screws 58 contact the floor 26 of the vehicle bed to establish the inclination of the arms 40 in the storage position and to prevent the arms from pivoting forwardly beyond the storage position. Preferably, the screws 56 are adjusted so that the arms 40 are held firmly against the tailgate 18 when the tailgate is closed and the unloader is in the storage position. Adjustment of the screws can be carried out by loosening the lock nuts 58 and threading the screws into or out of the arms 40 before again tightening the lock nuts.

Rigidly carried on the back end of each arm 40 is a generally rectangular shell 60 formed by steel plate. The shells 60 enclose various components of the drive system of the unloader, as will be explained more fully. Each shell 60 has a square outer plate 62 which extends downwardly below the back end of its arm 40. A sleeve 64 is rigidly mounted on each plate 62, as best shown in FIGS. 3 and 8. The sleeves 64 extend outwardly from the approximate centers of plates 62 and are aligned to receive the opposite ends of a horizontal axle 66 which mounts a cylindrical roller or drum 68. The opposite ends of the axle 66 are secured to the sleeves 64 by set screws 70 (FIG. 8). The axle 66 thus serves as the primary structural member between the plates 62. The left end of the drum 68 (as viewed from the rear) is received on a large bushing 72 (Fig. 4). The opposite or right end of drum 68 carries a large sprocket 74 (FIGS. 5 and 8) which is housed within the shell 60 on the right arm 40.

The shells 60 form parts of the frame of the unloader and are rigid structures. The plates 62 have flanges on their opposite sides. The side of each shell 60 opposite plate 62 is formed by a cover plate 76 having a flange 76a (see FIG. 8) on its lower edge. A pair of angle brackets 78 are secured to each plate 62 by rivets 80, and the flanges 76a are secured to brackets 78 by screws 82 or other fasteners. Additional screws 84 (FIG. 5) secure the cover plates on the shells 60 to provide enclosed compartments within the shells.

The drum 68 extends between the cover panels 76 of the shells and is supported for rotation about the horizontal axis provided by the axle 66. The shells 60 project below arms 40, and the drum 68 is substantially centered on the shells so that the top surface of the drum is at substantially the same level as the floor 26 of the vehicle bed.

A flexible plastic conveyor sheet 86 is wound on the drum 68. The width of the sheet 86 is slightly less than the length of the drum 68, and the sheet is preferably constructed of a high density plastic having resistance to abrasion and a low coefficient of friction. The sheet 86 has one end secured to the outer surface of drum 68 and may be completely wound up on the drum, as shown in FIG. 4. The sheet can be unwound from the drum to extend along the tailgate and the entire length of the truck bed floor 26, as shown in FIG. 1. In the unwound condition, the sheet 86 preferably has its leading end resting against the back of the cab 14. The leading end of the sheet 86 is provided with a tubular handle 88 which can be gripped with the hand to facilitate unrolling of the sheet from the drum 68.

Figure 9:
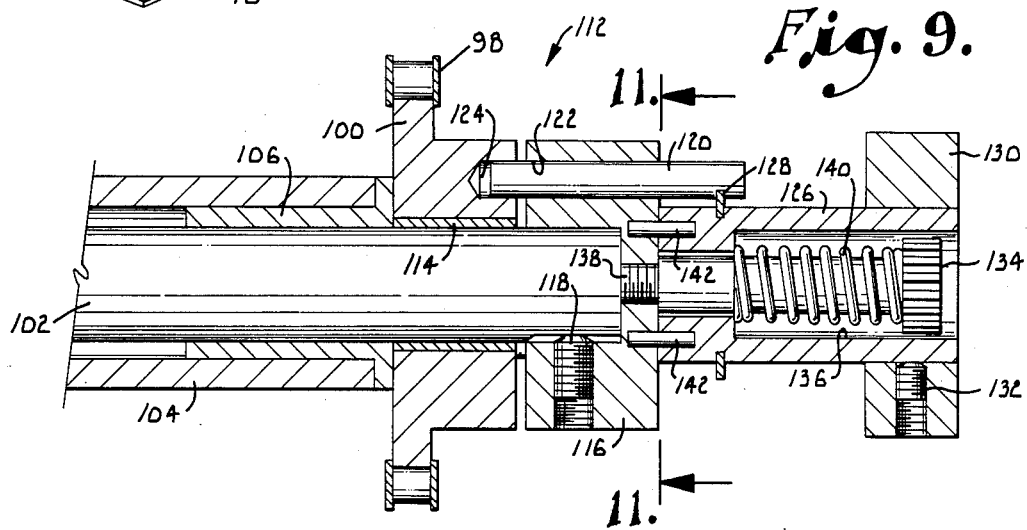
FIG. 9 is a fragmentary sectional view of an enlarged scale taken generally along line 9—9 of FIG. 8 in the direction of the arrows, with the clutch of the drive system in the engaged position.

An electric gear motor 90 operates to rotate the drum 68 in order to wind sheet 86 on the drum during the unloading operation. The gear motor 90 is bolted to a mounting bracket 92 which is in turn bolted or otherwise secured to the frame arm 40 located on the right side of the vehicle (as viewed from the rear). Motor 90 drives an output shaft 94 which carries a sprocket 96. A drive chain 98 as drawn around sprocket 96 and around another sprocket 100 which is mounted loosely on a shft 102 (see FIGS. 5 and 9). As best shown in FIG. 9, shaft 102 extends through a sleeve 104 which is secured to plate 62 at a location offset from the sleeve 64 which supports axle 66. A bushing 106 is fitted in sleeve 104, and the shaft 102 is received in the bushing 106.

As shown in FIG. 5, shaft 102 extends into shell 60 and carries a small sprocket 108 at a location within the shell 60. A chain 110 is drawn around sprocket 108 and around the large sprocket 74 located on the end of drum 68. The tension of chain 110 can be adjusted by a cam 111 which can be turned to vary the chain tension.

Figure 10:
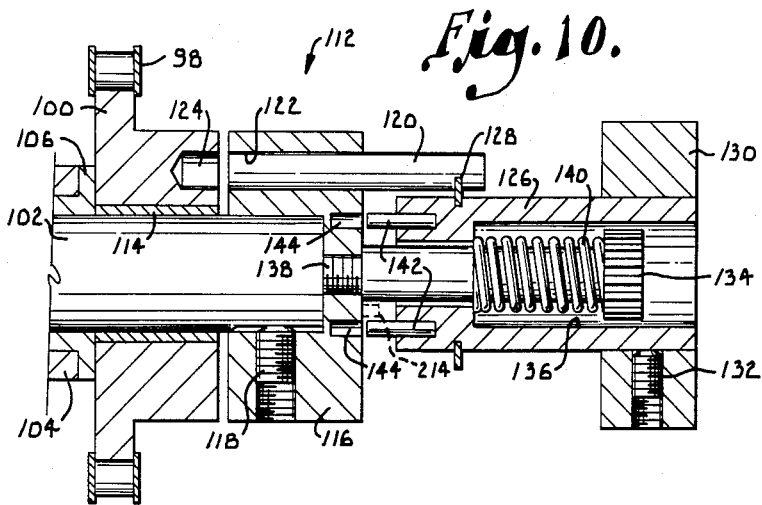
FIG. 10 is a fragmentary sectional view similar to FIG. 9, but showing the clutch in the disengaged position.

Sprocket 100 is connected to and disconnected from shaft 102 by a clutch mechanism generally designated by numeral 112. With particular reference to FIGS. 9 and 10, sprocket 100 is fitted on a bushing 114 which is received on shaft 102. The clutch 112 includes a drive hub 116 which is mounted on shaft 102 adjacent to one side of sprocket 100. A set screw 118 is threaded into the drive hub 116 and against the end of shaft 102 to rigidly mount the drive hub on the shaft. Three clutch pins 120 extend through passages 122 which are formed through the drive hub 116 and are oriented parallel to shaft 102. The clutch pins 120 are spaced equidistantly around the drive hub and are slidable axially in the passages 122. In the engaged position of the clutch 112 shown in FIG. 9, the leading ends of the clutch pins 120 are closely received in cavities 124 which extend into the adjacent face of the sprocket 100.

The clutch 112 is engaged and disengaged by operating a spool 126 which is connected with the clutch pins 120 by a flat ring 128. The ring 128 is received in an annular groove formed in the outside surface of spool 126 and is also received in grooves formed in the clutch pins 120. A handle or knob 130 is secured by a set screw 132 to the outer end of the spool 126.

A shoulder bolt 134 extends loosely through a central passage 136 formed through the spool 126. The shoulder bolt 134 has a threaded end 136 which is threaded into the face of the drive hub 116. A compression spring 140 is coiled around the shank of the shoulder bolt 134 and engages the enlarged head of the shoulder bolt at one end and the spool 126 at the other end. The compression spring 140 continuously urges the spool 126 toward the drive hub 116 and thus biases the clutch toward the engaged position.

Figure 11:
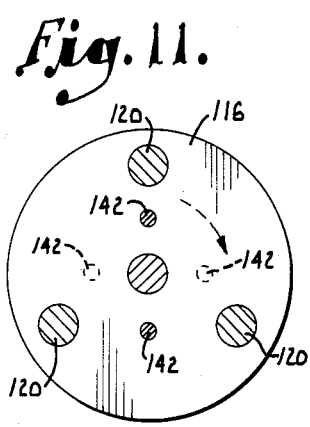
FIG. 11 is a fragmentary sectional view taken generally along line 11—11 of FIG. 9 in the direction of the arrows, with the broken lines illustrating the locations of the spool support pins in the disengaged position of the clutch.

A pair of diametrically opposed pins 142 are secured to spool 126 and project beyond its inner end. In the engaged condition of the clutch shown in FIG. 9, the pins 142 extend into recesses 144 formed in the adjacent face of the drive hub 116. In this condition, the clutch pins 120 extend into cavities 124 and thereby establish a driving connection between the sprocket 100 and the drive hub 116 which is rigidly mounted on shaft 102. The clutch can be disengaged by pulling spool 126 outwardly to withdraw pins 142 from recesses 144 and at the same time retracting the clutch pins 120 from cavities 124 to disconnect the sprocket 100 and drive hub 116. The clutch can be maintained in the disengaged condition by rotating spool 126 such that pins 142 are out of alignment with recesses 144. When the spool 126 is then released, the ends of the pins 142 rest on the face of the drive hub 116 in order to hold the clutch pins 120 in the retracted positions in which they are withdrawn from cavities 124. Preferably, the spool is rotated through an arc of approximately 90° to maintain the clutch in the disengaged condition (see FIG. 11). Ring 128 allows spool 126 to be rotated in this fashion.

As best shown in FIG. 1, the gear motor 90 and related components of the drive system are normally enclosed within a motor housing 146. The motor housing 146 is secured to shell 60 by screws 148. The knob 130 projects through the motor housing 146 and is thus at an accessible location so that the clutch 112 can be conveniently engaged and disengaged. As shown in FIG. 2, a toggle switch 150 controls the drive motor 90 and is located between a pair of small plates 152 projecting outwardly from the motor housing 146.

The unloader is provided with a wiping system which acts to wipe dirt and other debris off of the surfaces of the conveyor sheet 86. As shown in FIGS. 3 and 4, an angle member forms a wiper bar 154 which extends between the opposite shells 60 and is bolted at 156 to the shells. The top of the wiper bar 154 is at substantially the same level as the tailgate 18. Three lugs 158 are welded or otherwise secured to the wiper bar 154 at spaced apart locations along its length. A wiper blade 160 is carried on the lower ends of three mounting arms 62 which are pivotally connected at their upper ends to the lugs 158. A pivot pin 164 connects each arm 162 with the corresponding lug 158. The wiper blade 160 may take the form of an angle having one flange welded or otherwise secured to the mounting arms 162 and the edge of the other flange located adjacent to the conveyor sheet 86. Ech arm 162 is provided with a tension spring 166 which is hooked at its bottom end to the arm 162 and at its top end to the wiper bar 154. The springs continuously urge the wiper blade 160 toward drum 68, thereby maintaining the blade 160 against the plastic sheet which is wound on the drum. The wiper bar 154 and wiper blade 160 extend across the entire width of the plastic sheet.

A limit switch 168 is mounted on the wiper blade 160. The limit switch has a normally extended plunger button 170 which projects below the wiper blade 160. The button 170 is depressed by the tubular handle 88 when the plastic sheet 86 is fully wound on drum 68, as shown in broken lines in FIG. 4. When the button 170 of the limit switch is depressed, the drive motor 90 is deenergized regardless of whether to toggle switch 150 is in the on or off position.

The present invention also provides a pair of removable side panels 172 which protect the vehicle bed and the sidewalls 16 of the truck. The panels 172 are best illustrated in FIGS. 1 and 6. Each panel 172 is preferably formed from sheet metal and includes a vertical wall 174 and an inclined wall 176 at the top of the vertical wall 174. The panels 172 are hooked onto the sidewall 16 by a hook arrangement on the top end of each panel formed by a horizontal flange 170 and an inclined lip 180. The flange 170 fits over the top of the sidewall 16, while the flange 180 is located outwardly of the wall. An angular member 182 is secured to the inside surface of each panel 172 at the intersection between the inclined wall 176 and flange 178.

The angle 182 fits against the top of the sidewall 16 to help hold the panel 172 in place. A plurality of inclined braces 184 are secured to extend between the vertical wall 174 and inclined wall 176 of each panel. Each panel 172 has an inwardly projecting flange 186 on the lower end of wall 174. When the panels 172 are installed, the flanges 186 lie flatly on the floor 26 of the vehicle bed, as shown in FIG. 6. The back edges of panels 172 are provided with cut outs 190 in order to accommodate movement of arms 40 to the storage position.

The unloader is installed by bolting the mounting brackets 28 to the floor 26 of the vehicle bed at the proper locations to receive the frame arms 40. When the frame of the unloader is detached, the brackets 28 do not significantly interface with the cargo carrying capacity of the vehicle and do not obstruct access to the vehicle bed because of their out of the way location behind the wheel wells 30.

The frame of the unloader can be installed simply by positioning the arms 40 between the flanges 36 of the brackets and inserting the pivot pins 42 through the frame arms and one set of the holes 38 in each bracket. The retainer pins 44 can then be applied to secure the pivot pins in place. Normally, holes 36 near the back ends of brackets 28 are selected in order to mount the drum 68 immediately behind the tailgate 18 when the tailgate is lowered. This is best shown in FIGS. 1 and 2. However, it should also be noted that different holes 38 can be selected in order to move the drum 68 forwardly. For example, if the tailgate 18 is removed, holes 38 near the front ends of the brackets 28 can be selected to locate the drum immediately behind the bumper 24. Bumpers having different depths can be readily accommodated by selecting appropriate sets of holes 38. The provision of a number of sets of holes 38 thus permits the frame of the unloader to be installed at virtually any desired location and permits the unit to be installed in a wide variety of vehicles.

When the unloader is not in use, it can be removed from the vehicle bed if desired simply by removing the retainer pins 44 and the pivot pins 42 to detach the frame from the vehicle. When the vehicle is not hauling cargo, the frame of the unloader is normally raised to the storage position shown in broken lines in FIG. 2. This is accomplished by raising the tailgate 18 and latching it in the closed position, thereby raising the unloader along with the tailgate. The adjustment screws 56 should be adjusted such that the arms 40 are held tightly against the closed tailgate 18 in order to prevent the frame of the unloader from whipping back and forth and thereby causing possible instability and/or damage to the tailgate. Whether the unloader is mounted at the outboard position shown in FIG. 2 or at an inboard position with the tailgate 18 removed, it can be pivoted by itself to the storing position without simultaneously raising the tailgate. Raising of the unloader is assisted by the springs 46 which continuously urge the arms 40 to pivot upwardly about the pivot pins 42.

When the unloader is to be used, it is pivoted downwardly to the working or operating position shown in FIGS. 1 and 2. The side panels 172 are installed on the sidewalls 16 and serve to cover the wheels wells 30, the mounting brackets 28 and the majority of the spring suspension systems.

Knob 130 is pulled outwardly and rotated to disengage the clutch 112, and the plastic conveyor sheet 86 is then unwound from drum 68 to the position shown in FIG. 1. The handle 88 provides a convenient grip for unwinding the sheet. it is noted that the sheet overlies the flanges 186 on the opposite side panels 172.

When the sheet 86 has been fully unwound, materials of various types can be loaded into the truck bed on top of the sheet. The side panels 172 protect the bed and side walls 16 of the vehicle, and the sloping walls 176 provide a hopper or funnel effect to direct sand, dirt and similar materials down into the bed. When the bed has been loaded, the tailgate 18 can be raised to raise the frame of the unloader to the storage or transport position. The tailgate is normally latched in the closed position during transport of the load. When the material in the truck bed is to be unloaded, the tailgate and unloader are lowered to the position shown in FIGS. 1 and 2. Knob 130 is turned until pins 142 are aligned with recesses 144, and the spring 140 then moves spool 126 inwardly until the pins 142 enter the recesses 144 in the engaged condition of the clutch 112. This movement of the spool also causes the clutch pins 120 to enter cavities 124 to establish driving connection between the sprocket 100 and drive hub 116.

The toggle switch 150 is then moved to the on position, and the gear motor 90 is thereby energized to drive its output sprocket 96 and sprocket 100 through chain 98. The drive hub 116 and shaft 102 are also driven because of the driving connection established by the clutch pins 120. Shaft 102 drives sprocket 108 which in turn drives chain 110 and sprocket 74. The drum 68 is thereby turned in a counter-clockwise direction as viewed in FIG. 4 to cause the conveyor sheet 86 to wind onto the drum. As the sheet passes over the drum, any material carried on its top surface is unloaded onto the ground. If heavy equipment or the like is to be unloaded, it can be conveyed on sheet 86 to the tailgate area, and the switch 150 can be moved to the off position to stop the drive motor so that the equipment can be unloaded by hand or otherwise.

As the sheet 86 is wound onto drum 68, its bottom surface drags across the wiper bar 154, and any dirt or other material adhering to the underside of the sheet is thereby scraped off by the wiper bar. It is noted that the wiper bar is located beyond the tailgate 18 such that the material which is wiped off the sheet falls onto the ground.

The top surface of the sheet 86 is similarly wiped by the wiper blade 160 as the sheet is wound onto the drum. The spring force applied by springs 166 maintains the wiper blade 160 firmly against the plastic sheet 86 and assures that all mud and other material tending to adhere to the sheet is wiped or scraped off before the sheet is wound on the drum. Again, the location of the wiper blade 160 behind the tailgate and at a relatively low position relative to drum 68 assures that the material which is wiped off of the sheet falls onto the ground. The springs 166 maintain the wiper blade 160 firmly against the sheet as the diameter of the roll changes. At the same time, the spring force maintains uniform pressure of the wiper bar across the width of the sheet and accommodates any irregularities that may be present.

When the material has been fully unloaded, the handle 88 passes around drum 68 and is brought against button 172 when the sheet has been fully wound on the drum. The handle then depresses button 170 and thereby deenergizes the drive motor 90 automatically when the sheet has been fully wound onto the drum.

It is noted tht the beam-like arms 40 of the unloader frame provide the unit with columnar strength in line with the forces that are applied during operation of the unloader. The top of the drum 68 is in line with the floor 26, so there is no elevation of the load. In addition to the wiping action which prevents foreign materials from building up on the plastic sheet, the wiper blade 160 applies pressure to the sheet when it is fully wound on the drum, thereby resisting any tendency for the sheet to inadvertently unwind from the drum. Since the side edges of the sheet 86 travel on top of flanges 186, dirt and other materials are prevented from making their way underneath the sheet.

The drive motor 90 may be controlled by a dash mounted switch in the cab 14 of the truck. A single operator can then operate the unloader while driving the truck forwardly at a slow speed, as when the material are to be distributed on the ground. It is also contemplated that another type of remote control switch for the drive motor can be provided to permit other equipment to be operated while unloading of the vehicle bed is effected.

FIG. 12 illustrates an alternative embodiment of the invention which for the most part is constructed in the same manner as the embodiment previously described. The unit shown in FIG. 12 includes a winch and cable arrangement which serves to unwind the sheet from the drum 86 so that the sheet need not be manually drawn off of the drum.

In addition to the components previously described, the embodiment shown in FIG. 12 includes a winch 200 which is driven by the motor 90. In this embodiment, motor 90 is a reversible motor which operates in one directional mode to wind sheet 86 onto drum 68 and in the opposite directional mode to retract an elongate flexible cable 202 which is wound on the winch 200. The cable 202 is passed around a pulley 204 which may be mounted on the pivot pin 42. Cable 202 additionally passes around a pair of pulleys 206 mounted for rotation on an anchor plate 208 secured to the front end of the floor 26 adjacent the cab 14. The end of the cable is secured to a drag plate 210 which is suitably secured to the underside of the plastic sheet 86 at a location near but spaced from the tubular handle 88.

A limit switch 212 is mounted on the anchor plate 208 and is tripped by the drag plate 210 when the plastic sheet 86 has been fully unwound from drum 68. When the limit switch 212 is tripped, the drive motor is deenergized. A plunger switch 214 (see FIG. 10) is mounted on the face of the drive hub 116. In the engaged position of the clutch, the plunger 214 is depressed by spool 126 and then acts to prevent the drive motor from operating in a direction to retract the cable 202. In the disengaged condition of the clutch, the plunger 214 is released and the motor can then operate in a direction to retract the cable.

The embodiment of the invention shown in FIG. 12 operates to unload materials in substantially the same manner described earlier. However, when the sheet is to be unrolled onto the vehicle bed, the drive motor is placed in an operational mode to turn the winch 200 in a direction to wind up the cable 202. After the sheet has been partially unwound, materials can be unloaded on it, and subsequent operation of the motor further unwinds the sheet to load the materials into the truck bed. The sheet can be stopped at any time to permit additional materials to be loaded onto it.

When the sheet has been fully unwound, the drag plate 210 trips the limit switch 212, and the drive motor is then deenergized. Thus, the sheet can be unwound from drum 86 by operating the motor in one direction mode to load materials into the truck bed and wound onto the drum by operating the motor in the opposite directional mode to unload materials. When the sheet 88 has been fully wound onto drum 86, limit switch 168 is tripped by drag plate 210 rather than by the tubular handle.

FIG. 13 illustrates a manual drive system which may be provided as an alternative to the motor driven system described previously. In the manual drive system shown in FIG. 13, a ratchet drive hub 220 is secured to the end of shaft 102 by a set screw 222. Hub 220 is provided with a hexagonal fitting 224 and a cylindrical fitting 226 adjacent the hexagonal fitting 224. A ratchet lever 228 has a hexagonal opening 230 which can be applied to the hexagonal fitting 224 to establish a ratchet type driving connection between the lever and the shaft 102 which drives the drum 68 through the chain and sprocket arrangement previously described. The ratchet mechanism may be of any conventional type. A washer 232 and screw 234 act to hold the ratchet lever on the hexagonal and cylindrical fittings 224 and 226.

The ratchet handle can be applied to the hexagonal fitting 224 when the sheet 86 is to be wound onto drum 68. The ratchet lever is more effective than a crank type mechanism because it can be properly positioned to provide suitable leverage and to take full advantage of the body weight of the operator. When the sheet 86 is to be unwound from the drum 68, the lever is preferably moved onto the cylindrical fitting 226 on which it fits loosely. Then, the sheet can be unrolled without driving the ratchet handle.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Apparatus for unloading materials from a vehicle bed having a back end, opposite sides, and a tailgate hinged to the bed for movement between open and closed positions, said apparatus comprising:
   a frame including a pair of generally parallel frame arms each having a front end and a back end;
   means for connecting said front ends of the arms with the vehicle bed on opposite sides thereof in a manner permitting the frame to pivot about a substantially horizontal pivot axis between an operating position wherein the arms extend horizontally beyond the the back end of the bed and a storage position wherein the arms extend upwardly with said back ends located above the bed, said pivot axis being located adjacent the back end of the bed and substantially level with the bed to permit the arms to extend along the tailgate when the frame is in the storage position and the tailgate is in the closed position;
   a drum mounted for rotation in extension between said back ends of the arms;
   a flexible sheet wound on said drum and having an unwound condition wherein the sheet extends from the drum along the vehicle bed to receive materials loaded therein when said frame is in the operating position;
   means for effecting rotation of said drum in a direction to wind said sheet thereon, whereby materials on the sheet are conveyed rearwardly in the vehicle bed and unloaded from the back end thereof as the sheet is wound on the drum;
   a wiper blade for wiping material from the surface of said sheet on which materials are conveyed;
   means for mounting said wiper blade on said frame for movement generally toward and away from said drum at a location beyond the bed so that material wiped from the sheet by said wiper blade falls out of the bed;
   resilient means for urging said wiper blade toward the drum to maintain said wiper blade against said sheet to effect wiping thereof as the sheet is wound onto the drum; and
   means for wiping the surface of said sheet opposite the surface on which materials are received, said wiping means acting to wipe the sheet as same is wound on the drum.

2. Apparatus as set forth in claim 1, wherein said connecting means includes:
   a pair of rigid mounting brackets secured to the vehicle bed on opposite sides thereof; and
   removable pin means for pivotally connecting said arms with the respective brackets for pivotal movement about said pivot axis, said pin means being removable to permit removal of said frame and drum from the vehicle bed.

3. Apparatus as set forth in claim 2, wherein each bracket is constructed to accept said pin means at a plurality of locations spaced apart along the bracket length, thereby permitting the position of said drum relative to the back end of the vehicle bed to be adjusted.

4. Apparatus as set forth in claim 2, wherein:
   each bracket includes a pair of parallel flanges spaced apart from one another
   each arm has the form of a rectangular beam, the front end of which has a size to fit closely between the flanges of the bracket; and said pin means includes a pin adapted to fit removably through the arm and both flanges of said bracket.

5. Apparatus as set forth in claim 1, including an adjustable stop member on the front end of each arm engageable with the vehicle bed in the storage position of said frame to establish the inclination of said arms in the storage position, said stops being adjustable to hod said arms against the tailgate when the tailgate is closed and the frame is in its storage position.

6. Apparatus as set forth in claim 1, including a plate on the back end of each arm extending downwardly therefrom in the operating position of the frame, said drum being mounted between said plates for rotation with a top surface of the drum located at substantially the same elevation as the vehicle bed in the operating position of the frame, said sheet extending from the top surface of the drum.

7. Apparatus as set forth in claim 6, including an axle extending between said plates to establish a substantially horizontal rotational axis, said drum being mounted on said axle for rotation.

8. Apparatus as set forth in claim 1, wherein said rotation effecting means includes:
   a shaft supported on the frame for rotation;
   a drive train between said shaft and drum for transmitting power therebetween;
   a hand lever; and
   means providing a ratchet connection between said lever and said shaft to turn the shaft when the lever is operated in one direction but not in the opposite direction.

9. Apparatus as set forth in claim 8, wherein said ratchet providing means includes:
   a ratchet hub on the shaft having means for turning the shaft when turned in one direction but not the other;
   a first portion of said hub on which said hand lever can be positioned to drivingly connect the lever to the hub; and
   a second portion of said hub adjacent said first portion, said lever being disconnected from the ratchet hub when positioned on said second portion, whereby the sheet can be unwound from the drum without backdriving the lever.

10. Apparatus as set forth in claim 1, including spring means extending between the vehicle bed and each frame arm for assisting in the raising of the frame about said pivot axis to the storage position.

11. Apparatus as set forth in claim 1, wherein the opposite sides of the vehicle bed has upstanding side walls, and including a pair of side panels having hook means thereon for detachably hooking the side panels to the side walls, each side panel having a flange on the vehicle bed which underlies a side edge portion of said sheet when same is unwound onto the vehicle bed.

12. Apparatus for loading materials into and unloading materials from a vehicle bed having front and back ends and opposite sides, said apparatus comprising:
   a frame including a pair of rigid frame members mounted on opposite sides of the vehicle bed adjacent the back end thereof;
   a drum mounted between said frame members for rotation about a substantially horizontal rotational axis;
   a flexible sheet wound on said drum and having an unwound condition wherein the sheet extends from the drum along the vehicle bed to receive materials loaded therein;
   power means on the frame for rotating said drum about said rotational axis in a direction to wind said sheet on the drum, whereby materials on the sheet are conveyed rearwardly in the vehicle bed and unloaded form the back end thereof as the sheet is wound on the drum;
   a plurality of pulleys mounted for rotation on the front end of the vehicle bed and another pulley mounted on the bed for rotation about a rotational axis aligned axially with said pivot axis;
   a elongate flexible cable having one end connected with a leading end of the sheet, said cable passing around all of said pulleys;
   power winch means on said frame for retracting said cable to unwind said sheet from the drum to effect the unwound condition of the sheet, whereby materials loaded onto the sheet are conveyed thereon into the vehicle bed as the sheet is unwound, said cable flexing around said other pulley to accommodate movement of said winch means about said pivot axis as the frame pivots between the operating and storage positions;
   a wiper blade for wiping material from the surface of said sheet on which materials are conveyed;
   means for mounting said wiper blade on said frame for movement generally toward and away from said drum at a location beyond the bed so that material wiped from the sheet by said wiper blade falls out of the bed;
   resilient means for urging said wiper blade toward the drum to maintain said wiper blade against said sheet to effect wiping thereof as the sheet is wound onto the drum; and
   means for wiping the surface of said sheet opposite the surface on which materials are received, said wiping means acting to wipe the sheet as same is wound on the drum.

13. Apparatus as set forth in claim 12, including:
   a limit switch on said front end of the vehicle bed for deenergizing said winch means when tripped; and
   a drag plate on said sheet at a location to trip said limit switch when said sheet is in the unwound condition.

14. Apparatus as set forth in claim 12, wherein said power means comprises:
   a reversible motor on the frame having opposite directional modes of operation and connected with said power winch means to drive same in a direction to retract said cable when said motor is energized in one directional mode; and
   a drive train connecting said motor with said drum to drive same in a direction to wind the sheet on the drum when the motor is energized in the opposite directional mode, said drive train including a clutch having an engaged condition wherein said drum is driven by the motor and a disengaged condition wherein the motor is disconnected from the drum.

* * * * *